United States Patent
Sturrock et al.

(10) Patent No.: US 7,650,267 B1
(45) Date of Patent: Jan. 19, 2010

(54) DISTRIBUTION OF DES REPLICATIONS IN A SIMULATION

(75) Inventors: David Thayer Sturrock, Evans City, PA (US); Cory R. Crooks, Moon Township, PA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 656 days.

(21) Appl. No.: 11/394,612

(22) Filed: Mar. 31, 2006

(51) Int. Cl.
G06F 17/50 (2006.01)
(52) U.S. Cl. ............................................. 703/6; 703/13
(58) Field of Classification Search ................... 703/13, 703/6
See application file for complete search history.

(56) References Cited

U.S. PATENT DOCUMENTS

| | | | |
|---|---|---|---|
| 5,544,348 A * | 8/1996 | Umeda et al. ................. | 703/17 |
| 5,761,488 A | 6/1998 | Donath et al. | |
| 6,018,716 A * | 1/2000 | Denardo et al. ................ | 705/7 |
| 6,110,217 A | 8/2000 | Kazmierski et al. | |
| 6,427,132 B1 | 7/2002 | Bowman-Amuah | |
| 6,612,382 B2 | 9/2003 | King | |
| 6,675,189 B2 * | 1/2004 | Rehg et al. .................. | 718/100 |
| 6,941,257 B2 | 9/2005 | Roesner et al. | |
| 6,944,596 B1 | 9/2005 | Gray et al. | |
| 2001/0051862 A1 | 12/2001 | Koji et al. | |
| 2003/0171908 A1 | 9/2003 | Schilp et al. | |
| 2004/0102940 A1 * | 5/2004 | Lendermann et al. .......... | 703/6 |
| 2004/0193393 A1 | 9/2004 | Keane | |
| 2005/0177353 A1 | 8/2005 | Slater | |

OTHER PUBLICATIONS

Paul F. Reynolds, Carmen M. Pancerella, Sudhir Srinivasan, "Making Parallel Simulations Go Fast", Proceedings of the 1992 Winter Simulation Conference, pp. 646-656.*

* cited by examiner

Primary Examiner—Paul L Rodriguez
Assistant Examiner—Dwin M Craig
(74) Attorney, Agent, or Firm—Turocy & Watson LLP; William R. Walbrun

(57) ABSTRACT

A simulation system includes a receiver component that receives multiple replications of a simulation scenario. The simulation scenario includes a plurality of interacting components representing devices and elements of the real-world system or abstract process to be simulated. Each of the interacting components has one or more numerical parameters associated therewith, to represent an operational parameter of the system device. During the execution of the replications, each replication operates with a randomness factor that modifies a respective numerical parameter, in accordance with the sorts of variations that can be expected in the actual system. An assignment component is included that assigns a subset of the replications to multiple processors such that a processor within the multiple processors executes at least one replication.

34 Claims, 17 Drawing Sheets

DISTRIBUTION OF DES REPLICATIONS IN A SIMULATION

TECHNICAL FIELD

The claimed subject matter relates to the field of simulation and, more particularly, to discrete event simulation (DES).

BACKGROUND

In the ongoing effort to improve efficiency, businesses are always seeking new ways to improve the performance of their enterprise, by reducing costs, increasing throughput and eliminating bottlenecks in the flow of productivity. Also, millions of dollars can be invested in installing new facilities or redesigning old facilities, e.g. a manufacturing line or a retail establishment. Business managers are interested in arriving at an efficient layout and resource allocation prior to such capital investment.

To identify weak points in a business system, Discrete Event Simulation (DES) is a tool increasingly used to model the functionality and behavior of a business. With DES, a model of a business system can be built and simulated on a computer. The computer model is then executed to simulate normal operations over a period of time to observe the system's performance. DES is similar in principle to the variety of other computer simulations currently in use, such as flight simulators and certain strategic computer games. DES extends the simulation principle to commercial applications. A number of enterprises are currently using DES to model their operations, including the fields of banking, manufacturing, supply chain analysis, health care, airport security, and the military. A two- or three-dimensional visualization of a numerical output is typically created to facilitate understanding and validation of a simulation model as it would relate back to a real world system. The visualization is also important for communication, to help business managers and customers understand the problems and solutions addressed by the simulation.

For example, a business may use DES in conjunction with designing a new manufacturing plant or making major modifications to an existing plant. Perhaps the business is not obtaining the desired throughput because of a bottleneck at a certain machine station. A simulation model is created to simulate the manufacturing line, and a numerical description of the system is inputted into the model. The simulation model includes interactive components, and the numerical parameters specify the configuration and behavior characteristics of its "real world" counterpart. Each machine, operator and any other component of the system can be represented as a particular set of numerical parameters that are represented in the model. The interactive components are typically laid out in a two- or three-dimensional representation of the arrangement of the actual system components.

After numerically representing the system components, the model is then executed in a "scenario" in which the model is set in motion so that all the components are operating with respect to time according to their numerical parameters. In this way, the scenario simulates interactivity of the components in the manufacturing plant over a selected period of time, enabling observation of the interactive behavior of the model. If a specific machine is identified as a problem source, the model can be revised to include a new set of parameters representing a component modification, e.g. a modified machine or even a different machine in place of the problem source. The model is run with respect to the scenario to obtain a numerical output. In order to adequately simulate the real system, the model must factor in device failures, component malfunctions, variations in load, flow, or capacity, variations in congestion, and any other factors that interrelate and make prediction of behavior difficult. Simulation allows modeling of complex systems to obtain accurate answers and determine a desirable configuration of a system.

It is well understood that project development often takes longer than expected, leaving less than desired time for the analysis of simulation results. In order to maintain a schedule, an analyst may run a small number of alternative scenarios, and in so doing, might miss a better solution to a problem. On the other hand, the analyst may run fewer replications of each alternative scenario, resulting in lower predictive accuracy and possibly yield an incorrect solution. Consequently, discrete event simulations take a long time to execute to enable thorough analysis. As modeling technology has improved, models have gotten steadily larger and their execution time has increased proportionally, thereby exacerbating the problem. While higher-speed computer processors have sped up execution time, the problem is not fully addressed.

High Level Architecture (HLA) and similar techniques have been used to split a replication into dependent components and execute each of them synchronously on a number of different processors so that e.g. the operation of a forklift is modeled on one processor and the operation of a receiving machine is modeled on another processor. With this approach, the time clocks of each processor must be synchronized. However, if the component on one processor has run e.g. 10 minutes ahead, the interaction with the other components fails. It has been found that more system overhead is devoted to synchronizing the processor's time clocks than advancing the time clocks. The overhead of coordination is prohibitively difficult, resulting in poor performance.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to implementation of a simulation scenario that reduces processing time without sacrificing accuracy of a simulation. In one example, multiple replications of a simulation scenario can be received, wherein the simulation scenario includes a plurality of interacting components representing devices and elements of a real-world system or abstract process to be simulated. Each of the interacting components has one or more numerical parameters associated therewith, wherein the numerical parameters represent an operational parameter of a system device. During execution of the replications, each replication operates with a randomness factor that modifies a respective numerical parameter in accordance with the sorts of variations that can be expected in the actual system. A subset of the replications can be assigned to multiple processors such that a processor within the multiple processors executes at least one replication. Additionally, processor speed, bandwidth and performance can be analyzed so as to facilitate assignment of replications to processors in accordance with their determined performance and/or capabilities.

In another aspect, a designer or operator wishing to implement a discrete event simulation of a real-world system (e.g. a manufacturing or other business model or other enterprise solution) can create a simulation scenario model having a plurality of interacting components representing actual components in the system, and programmed with one or more numerical parameters, which represent a physical property or operational state of the component. One or more of the interacting components includes a randomness factor to modify the respective numerical factor during the simulation scenario. The randomness factor corresponds to an actual variation that can occur in the component's operation in the modeled system. The scenario is executed in a plurality of replications of the simulation scenario. The randomness factor acts upon the numerical parameter of the component so as to produce a different result for each replication. In such a system, a plurality of processors are used for executing a plurality of replications. Results from each of the plurality of processors can be received and compiled.

In one particular example, the simulation implementation can include a master processor component for initiating the plurality of replications. The master processor component can include a compiler component. A number of dependent processor components can receive instructions from the master component to execute one or more replication, returning the result to the master processor component. In a specific aspect, the master processor component and the plurality of dependent processor components can each be individual computers connected over a network. In another aspect, the master processor component and the dependent processor components can all be individual processors included within one or multiple processor computer grids. Also, the master processor component can include a dependent processor component, so as to perform its own set of replications while the remaining dependent processors are operating.

Furthermore, the dependent processor components can execute a single replication or they can execute a set of replications. In another aspect, the dependent processors can be configured to perform a "batch" of replications in which the initial state of a particular replication is dependent on the outcome of the state of a previous replication. Replication batches are especially useful for simulations that model the behavior of a "non-terminating" system, a system that runs continuously without a beginning or end. The scenario executes a "warm-up period" prior to performing the batch of replications. During the warm-up period, each of the plurality of processors is configured to execute the scenario with the randomness factor in the numerical parameter. The warm-up period executes for a specified duration, thereby establishing an initial condition for the numerical parameter. The result of a previous replication in a batch, operating on each processor, is used to establish an initial condition for a component's numerical parameter in a subsequent replication.

The randomness factor of a specific replication can be determined by a random number stream, e.g. from a typical random number generator. In another aspect, the randomness factor can be determined by a "random number seed" in which a random number is selected from a constrained set of random numbers, so as to introduce an element of determinacy into the randomization process. A different random number seed can be applied to each batch of replications executed on each processor. In a particular aspect, a process analyzer can be used for configuring some or all of the processors to execute a number of alternative scenarios, in which a different numerical parameter is used for each scenario. Optionally, an optimizer can be used for configuring the plurality of processors to execute a sufficient number of alternative scenarios, so as to optimize the simulation.

To the accomplishment of the foregoing and related ends, certain illustrative aspects are described herein in connection with the following description and the annexed drawings. These aspects are indicative, however, of but a few of the various ways in which the principles of the claimed subject matter can be employed, and such matter is intended to include all such aspects and their equivalents. Other advantages and novel features will become apparent from the following detailed description when considered in conjunction with the drawings.

DETAILED DESCRIPTION

Figure 1:
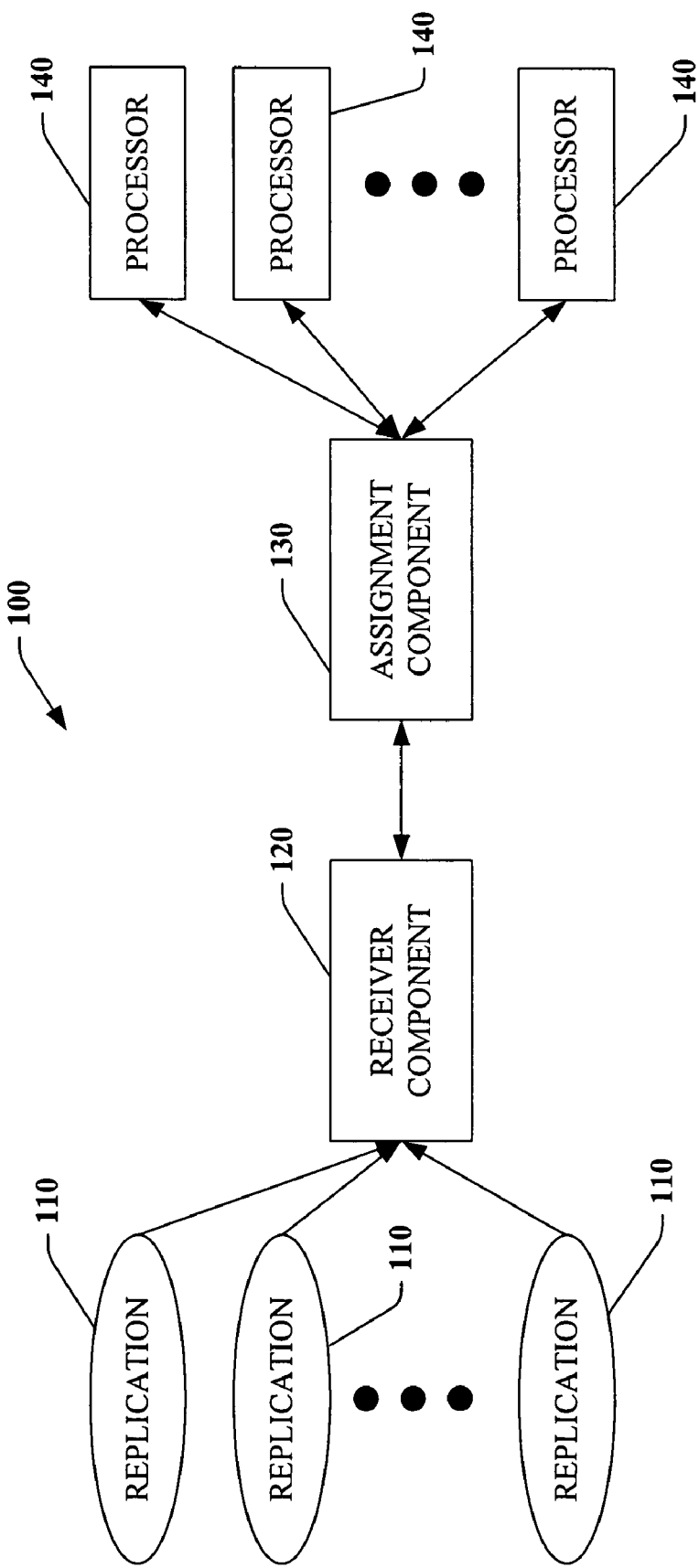
FIG. 1 is a high-level block diagram of a simulation system that facilitates execution of multiple replications on multiple processors.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

FIG. 1 illustrates a system 100 that facilitates undertaking a discrete event simulation. The system 100 includes a receiver component 120 that receives multiple replications 110 of a simulation scenario. The simulation "scenario" or "model" is a numerical characterization of a real-world system or abstract process over a specified amount of time, created and executed on a computer, in which the relevant physical or operational characteristics of the system are represented. The scenario is formed of a number of "interacting components" that represent the operable elements of the actual system. For example, in a simulation of a manufacturing environment, the interactive components can represent machines, workers, transport devices and all other elements of the factory setting that assist in the manufacturing process. Each component has one or more "numerical parameters" associated therewith that define the configuration of the component, e.g. sizes, speeds, volumes, flow, distances of separation to other interacting components, etc. As further shown in FIG. 1, the scenario is executed in a plurality of "replications" 110 in which the same scenario is executed a certain number of times, with a variable "randomness factor" operating on the numerical parameter of the interacting component, so as to produce variable performance. With each replication 110, the randomness factor varies the numerical parameter within predetermined bounds in such a way that it can characterize actual variation that can be expected to occur within the real-world system being modeled. The randomness factor can vary within each replication to simulate various conditions of the interacting components, e.g. so as to simulate a machine that is operating under too heavy or light a load, or operating with too much or too little hydraulic pressure, or operating with one or more fault conditions. By running multiple replications, it is anticipated that the simulation will converge toward a meaningful result representative of the performance of the actual system.

The system further 100 includes an assignment component 130 that assigns a subset of the replications to multiple processors 140 in such a way that a processor 140 within the multiple processors 140 executes one or more replications 210. In running multiple replications on multiple processors, the system 100 produces replication results more quickly than has been obtained with previous systems. And by producing results quickly, a greater number of alternative scenarios can be performed, thereby allowing even greater accuracy and benefit to the simulation process. The system 100 overcomes the difficulties of previous-type solutions that model each individual component of a system on a separate processor, thereby suffering from the problems associated with synchronizing the processors. In this way, the subject system 100 offers manifold improvements in speed, efficiency, accuracy and overall performance benefit from the simulation.

For purposes of illustration, some specific examples follow of real world systems that can be simulated through utilization of the system 100 or other similar systems described herein. It is to be appreciated that these examples do not in any way limit the number or type of enterprises that can be simulated with the subject system 100, but are merely cited for depicting the diversity of such enterprises, and the versatility with which the subject system 100 can model and simulate any real-world endeavor, particularly any commercial or other logistical enterprise. For instance, in a manufacturing environment, a number of forklifts may be used to deliver a supply parts to a machine, where a fabricating process is performed on the parts. The business managers may wish to learn the sufficient number of forklifts so as to enable smooth operation, e.g. enough forklifts to efficiently deliver the parts (accounting for maintenance cycles and other availability factors) yet not too many so that forklifts are idle, resulting in unnecessary expense. A scenario can have each forklift and the machine as components, and the numerical parameter would include an average travel time required for a forklift to move from "Point A to Point B." But even in an automated system, various randomness factors prevail so that the forklift travel time may require between one and 15 minutes (e.g. variations in load weights, operator skill, forklift performance, etc.) After running ten to thirty replications, the results converge toward a travel time value of two minutes on average, and the business managers can determine a desirable cost-benefit relationship for purchasing a sufficient number of forklifts to accommodate this result, e.g. fifteen forklifts for the system.

In another example, a hospital may wish to analyze the performance of its emergency department, including staff and operating rooms versus the flow of incoming patients. The hospital's goals may include keep its rooms and staff busy for greater periods of time rather than investing in another operating room or emergency room. A simulation of the emergency room is modeled with these interactive components. However, as the emergency room is driven toward 100% utilization, seriously ill patients may be made to wait, which could result in higher patient mortality. So the scenario needs to also include a numerical parameter to represent patient mortality, which results in additional staff and facilities, thereby driving up costs. The simulation therefore should consider the randomness of incoming patients with varying seriousness of conditions, so as to balance costs and resource utilization with patient service.

Discrete event simulation can also be used in retail establishments to model customer flow, peak periods, inventory management and so forth. The military may use DES to simulate logistics, e.g. determining staging areas, troop levels in particular staging areas, movements of troops and materiel. An airport may seek to model how long passengers wait in line, how long inbound aircraft may circle waiting for runway access, or how long outbound aircraft wait at the gates. Other examples abound as applied to nearly any field of endeavor. The subject simulation system 100 has particular applicability with industrial control systems, and can be included in a commercial control system application package where process simulations can be performed alongside actual control systems, to model and improve a control operation in parallel with a real world process.

Figure 2:
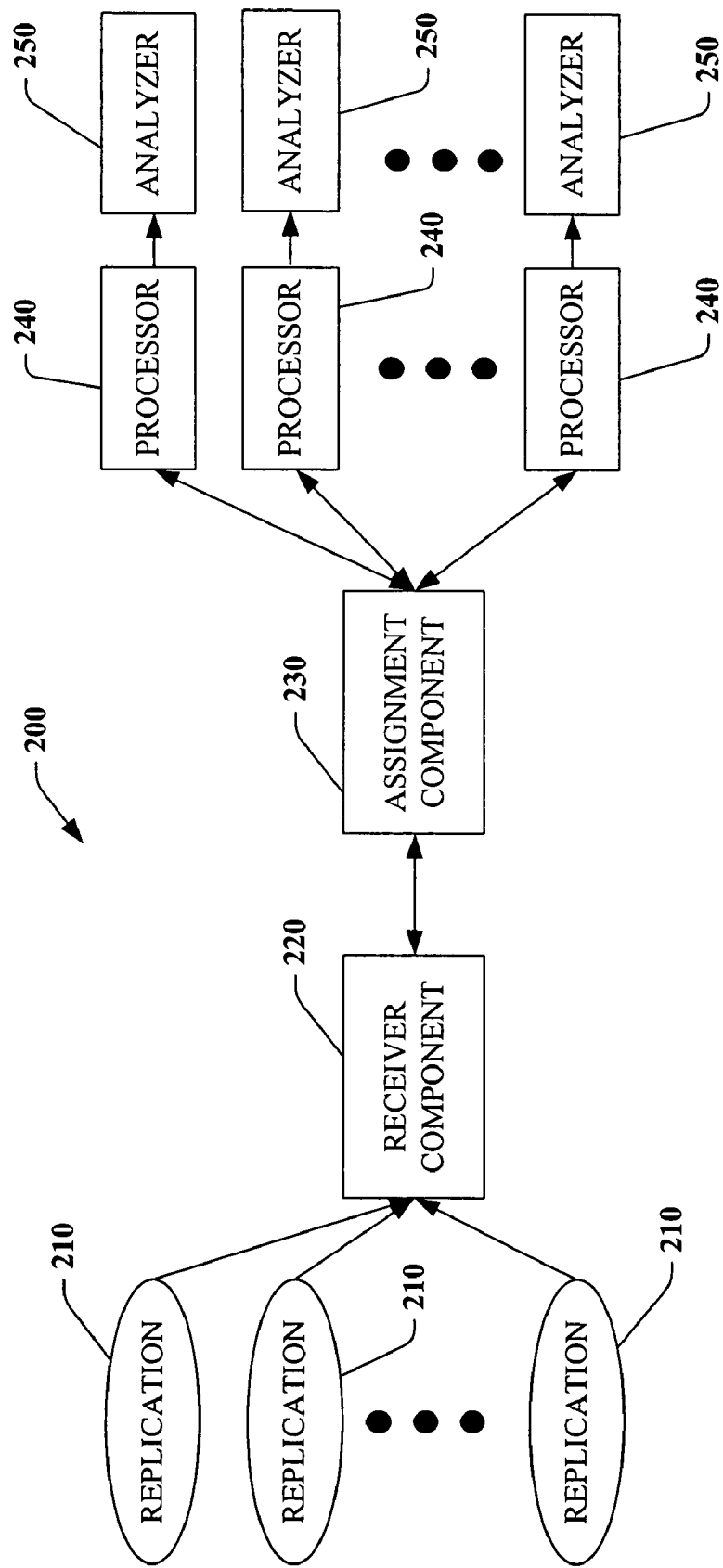
FIG. 2 is a block diagram of a simulation system that executes multiple replications on multiple processors with an analyzer for measuring processor performance.

Referring now to FIG. 2, a system 200 that further facilitates the execution of a discrete event simulation is illustrated. The system 200 includes a receiver component 220 that receives multiple replications 210 of a simulation scenario. The receiver component 220 forwards the replications 210 to an assignment component 230. In this and other examples, it is to be appreciated that the receiver component 220 and the assignment component 230 can represent hardware or software components, or a combination thereof. The assignment component 230 assigns at least a subset of the replications to multiple processors 240 so as to enable each processor 240 from among the multiple processors 240 to execute one or more replications 210. In the subject system 100 as illustrated in FIG. 2, the assignment component 230 cooperates with one or more analyzer components 250 that analyze the speed, bandwidth, power and performance of each processor 240. While shown as separate components that individually monitor a corresponding processor, it is to be understood and appreciated that a single component can monitor each processor and/or that several analyzer components 250 can operate in conjunction to monitor the processors 240. The analyzer components 250, while not shown, can be communicatively coupled to the assignment component 230. In this way, the analyzer components 250 facilitate assignment of replications to processors in accordance with their performance. In other words, if it is found that a particular processor is already engaged in a number of processes, the assignment component 230 will assign a fewer number of replications to that processor, and distribute the load to the other processors. The analyzer components 250 can monitor the processors 240 continuously, so as to monitor the current loads on each processor. If need be, the replications 210 can be reassigned if one processor 240 becomes busy. Therefore, the assignment component 230 can reallocate system resources so as to insure that all the replications 210 can be finished at the same time, thereby further enhancing efficiency.

Figure 3:
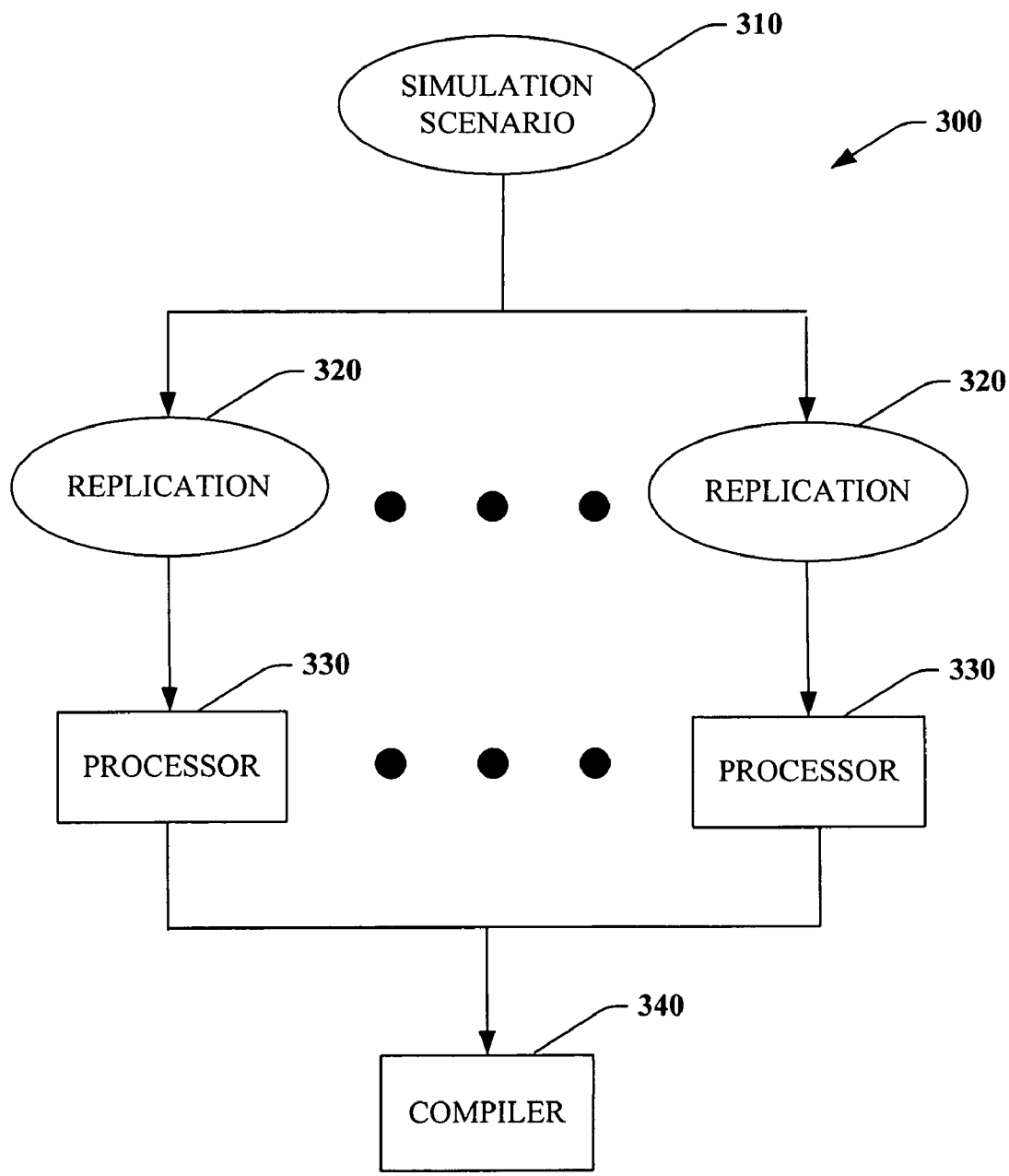
FIG. 3 is a block diagram of a system that facilitates implementation of a simulation scenario.

FIG. 3 illustrates a simulation system 300 for implementing a simulation scenario 310, where the simulation system 300 can include a hardware system for executing the scenario 310. The scenario 310 resides on the hardware system, and the receiver component is incorporated therewith. As with the above examples, the scenario 310 is executed in a plurality of replications 320, so as to model different outcomes of the scenario. The assignment component is a hardware or software component of the system, and a plurality of processors 330 are provided to execute the plurality of replications, as discussed above. Many hardware variations are contemplated, and these will be discussed in greater detail below. The system 300 includes a compiler component 340 that receives and compiles the results from each of the plurality of processors, e.g. in a database or a statistical analysis program. The compiler component 340 presents the scenario results for useful analysis of the simulation.

Figure 4:
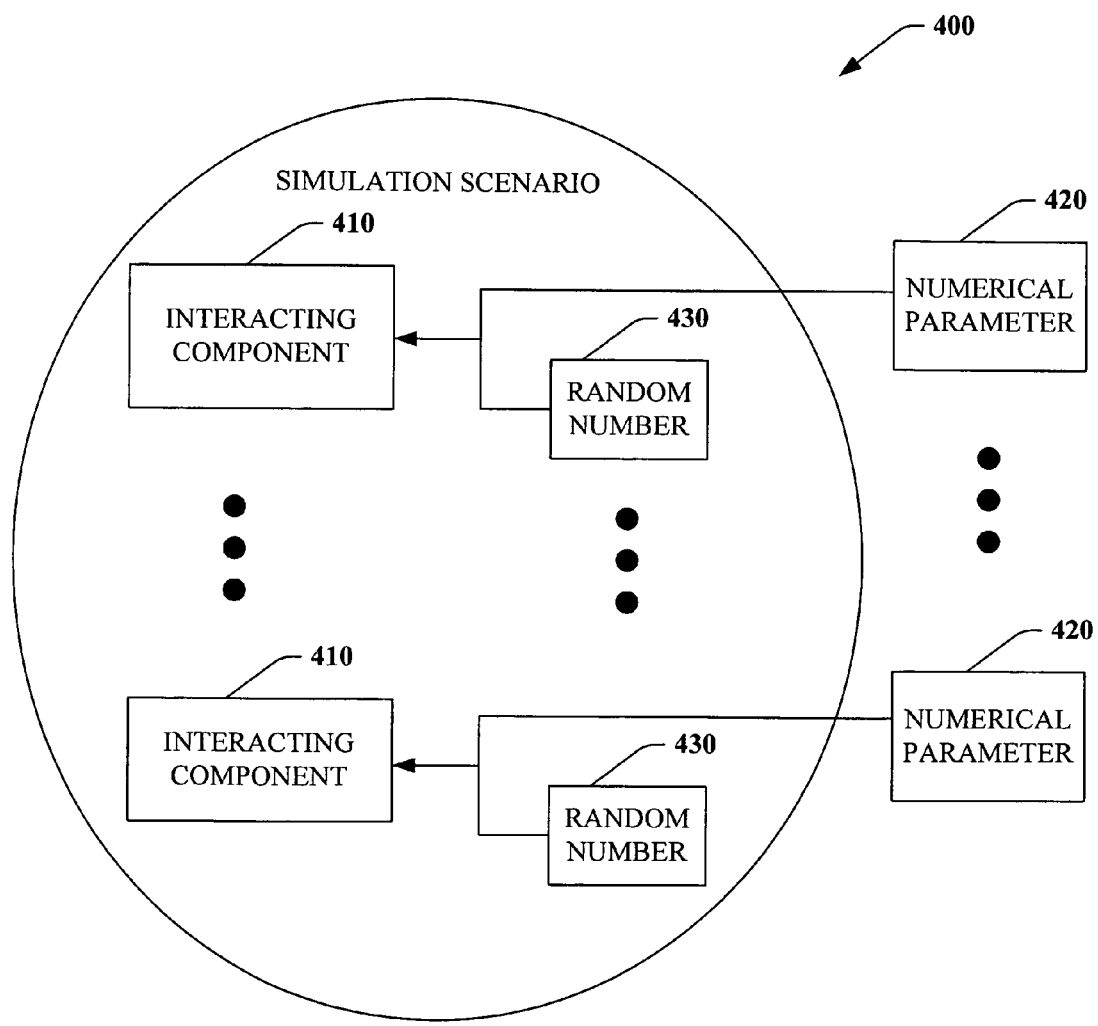
FIG. 4 is a block diagram illustrating the component details of the simulation scenario.

FIG. 4 shows the component details of the simulation scenario 400 in reference to the claimed subject matter. As disclosed above, each of the interacting components 410 represent an actual component in a real-world system to be modeled. The interacting components 410 are numerical quantities that are mathematically characterized so as to operate in accordance with the actual component in the simulation environment. The interacting components 410 are programmed with one or more numerical parameters 420 each representing a physical property or operational state of the actual component. As previously noted, these numerical parameters 420 can represent mechanical force or torque generated by a moving part, hydraulic pressure in a system, electrical current and voltage, heat generated during operation, signal characteristics of a system, etc. The numerical parameters 420 as depicted are shown outside the simulation to illustrate that these can be programmed prior to executing the simulation scenario 400 so as to indicate predefined system variations that may be modeled in a particular scenario. However, it is to be appreciated that the values of one or more of the numerical parameters 420 can be permanently assigned to a component 410 in the scenario 400. One or more of the interacting components 410 incorporates a randomness factor 430 to modify its associated numerical parameter 420 during the execution phase of the simulation scenario. The randomness factors 430 correspond to variation that can occur in actual component operation. The randomness factor 430 influences the numerical parameter 420 of the interacting component 410 so as to produce a different result for each replication. The randomness factor 430 can be a true random number, or can be defined and selected in order to program a range of specific results, as will be set forth in greater detail below.

Figure 5:
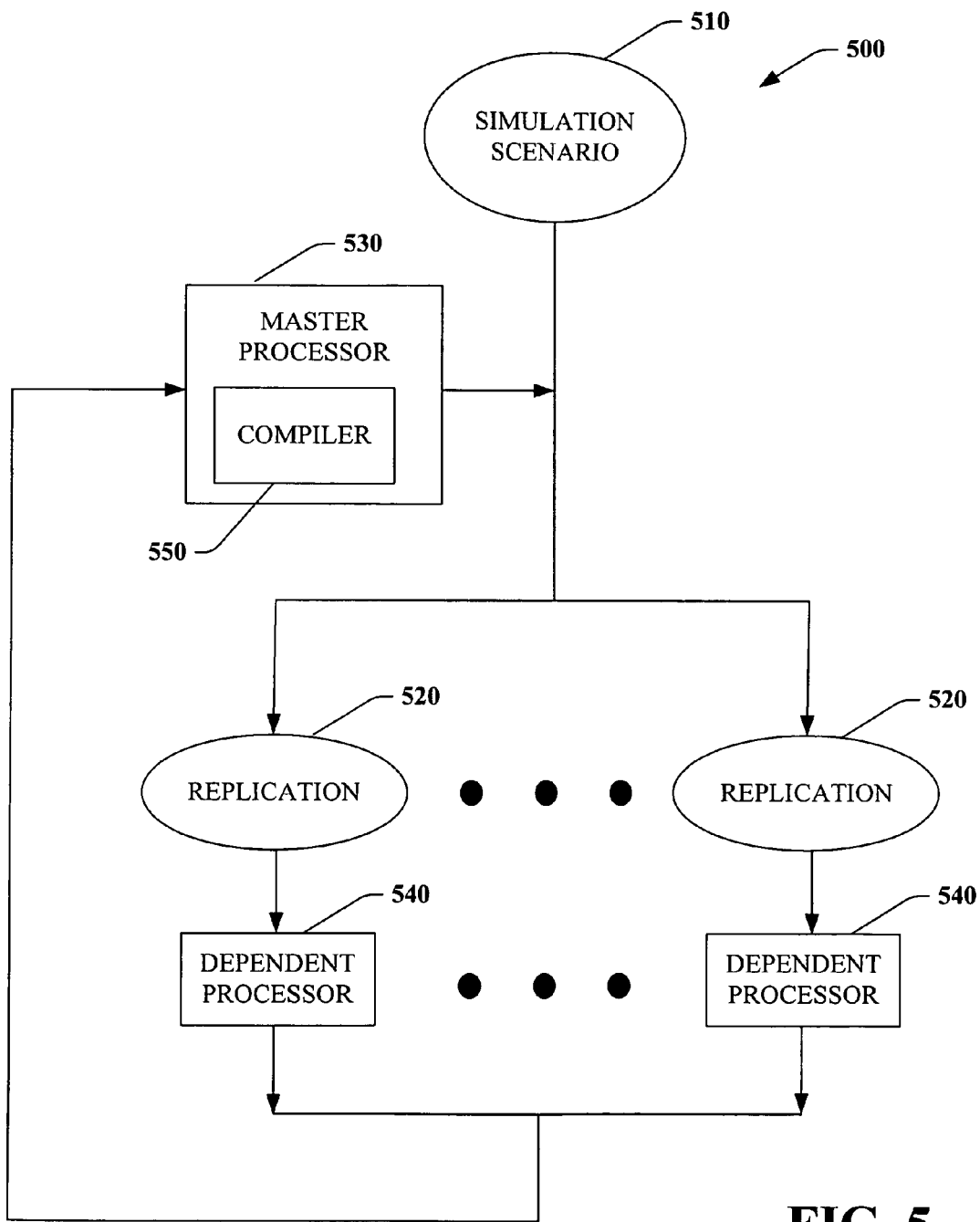
FIG. 5 illustrates a simulation system having a master processor that controls a plurality of dependent processors.

In another particular example, as shown in FIG. 5, a simulation system 500 generally includes a scenario 510 and a plurality of replications 520 run on plurality of processors. In the example, the assignment component as disclosed above can be a master processor component 530, which can be a discrete hardware component provided for generally managing the multiple replications and compiling the results. A number of dependent processor components 540 execute the replications under the control of the master processor component 530. To that end, the master processor component 530 sends control instructions to the dependent processor components 540 so as to initiate the replications. The dependent processor components 540 execute one or more replications, and return the results to the master processor component 530. The compiler component 550 is a subcomponent included in the master processor component 530 and receives and presents the replication results for analysis.

Figure 6:
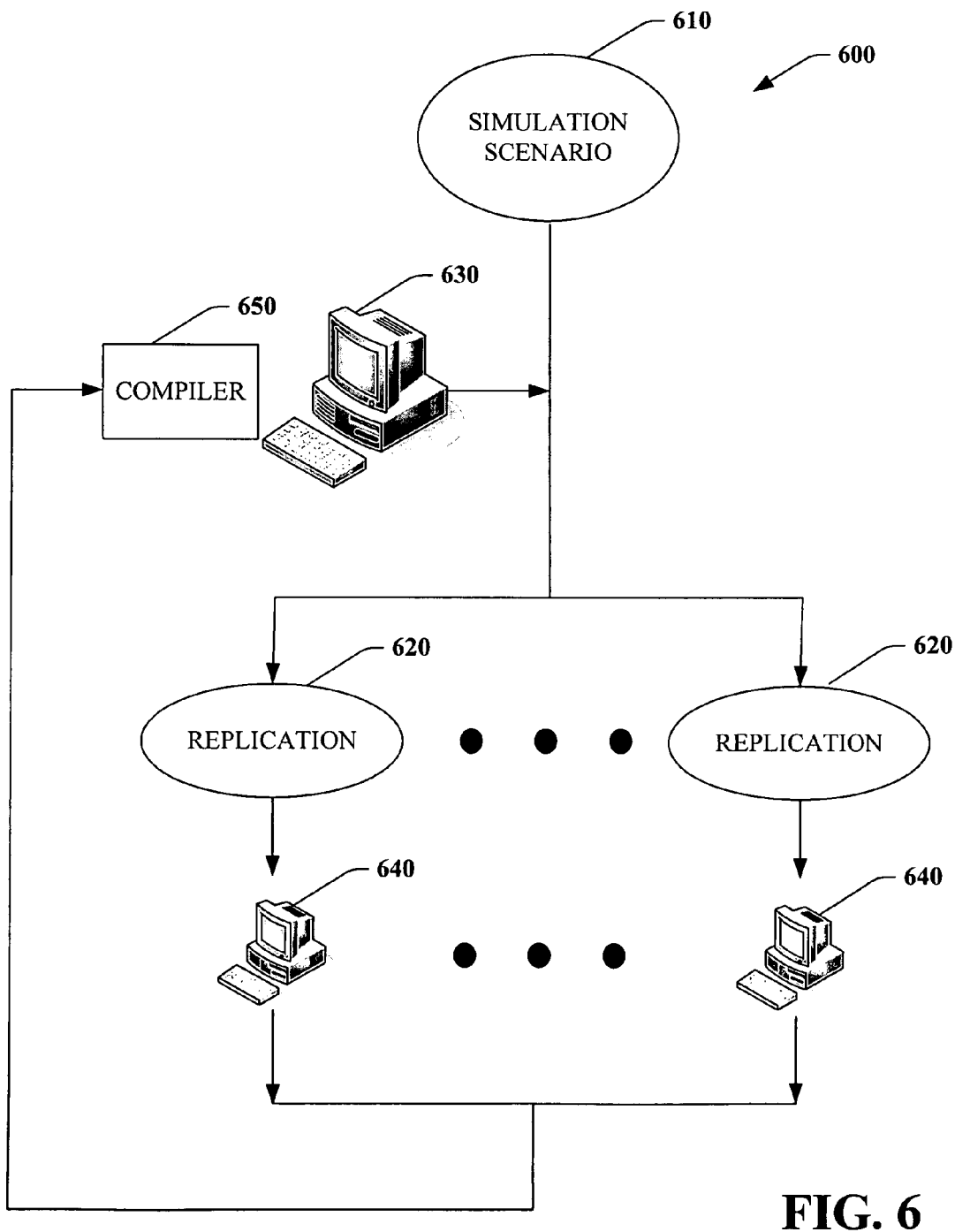
FIG. 6 is a simulation system in which the master processor and dependent processors are computers distributed over a network.

In another aspect, in an exemplary simulation system 600 as shown in FIG. 6, a master processor component 630 and a plurality of dependent processor components 640 can each be individual computer workstations connected over a network. Each individual computer 640 can run one or more replications 620 of the simulation scenario 610, and send the results back to the compiler 650, which can be a hardware or software component incorporated into the master computer 630 or a separate, external device, e.g. a peripheral component, connected to the master computer 630 or another component located remotely along the network. The network can be a LAN, WLAN, the Internet, or any other suitable scheme for networking computers. By distributing the computers over a network, the replications can be run over different workstations in a corporate site, or even different corporate locations over a wider distribution. For example, the computers can be located in different cities, e.g., one in New York, another in San Francisco, etc. Also, if a need for replications is greater than what can be simulated through available resources, replications can be offloaded onto commercially-available bandwidth that can be rented from servers at one or more remote locations connected over the Internet. The master processor component 630 can monitor and supervise progress remotely, and receive the results upon completion of the replications.

Figure 7:
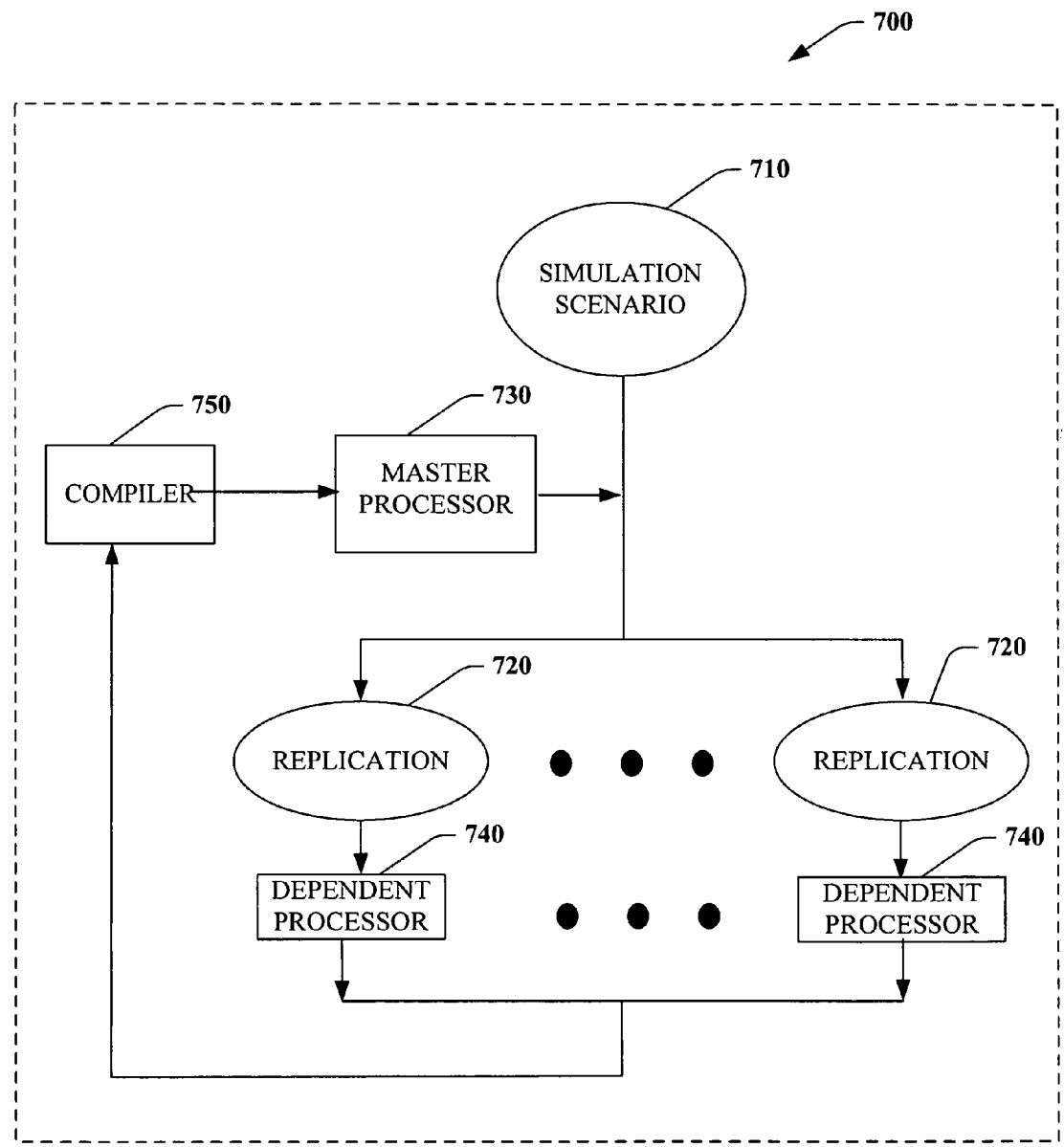
FIG. 7 is a simulation system in which the master processor and dependent processors are included in a multi-processor grid.

In another aspect, in an exemplary simulation system 700 as shown in FIG. 7, a master processor component 730 with a compiler 750 and a dependent processor components 740 can all be individual processors included within one or multiple processor computer grids. In a multiple processor grid, a number of microprocessors are retained within a single case, thereby allowing a large amount of processing to be performed within a single machine. An exemplary grid component can include 14 dual processor CPUs in a single housing. In the exemplary aspect, all the model replications 720 of the simulation 710 are distributed across multiple CPUs within the grid component and thereby significantly reduce the time required to analyze complex simulation models. It is to also be appreciated that multiple grid components can be used for performing even larger numbers of replications, and these grid components can be co-located in the same work area, or distributed geographically over a network, as in the above example. In a further exemplary aspect, in a multiple grid component arrangement, not all the dependent processor components 740 in a single grid component would necessarily be devoted to replications, but could also execute other processes, which may or may not be related to the simulation scenario.

Figure 8:
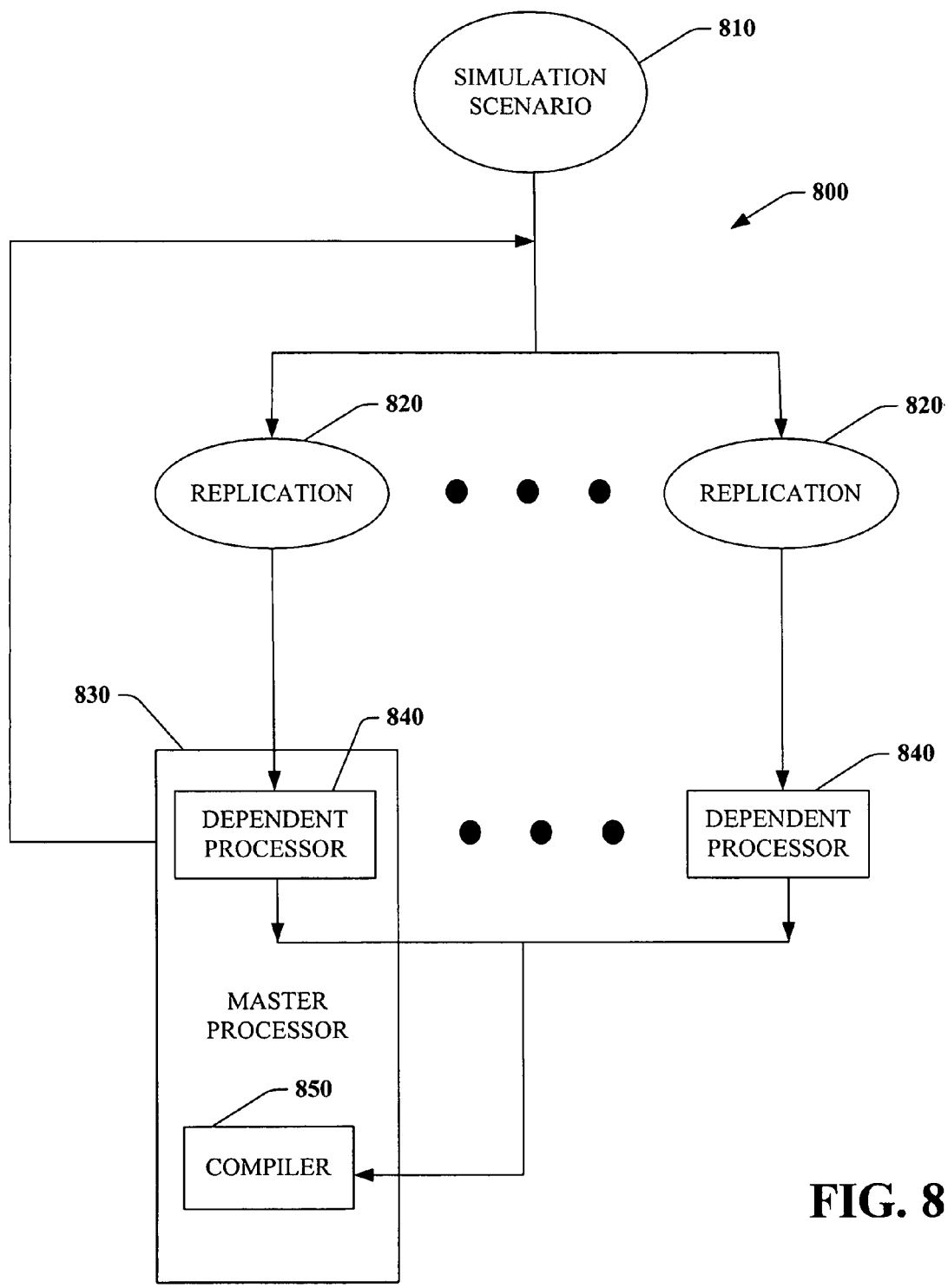
FIG. 8 is a simulation system in which the master processor includes a dependent processor.

In another exemplary aspect, as shown in FIG. 8, a master processor component 830 can function as its own dependent processor component 840. In this way, the master processor component 830 can execute its functions at the beginning and end of the replication cycle, and perform its own set of replications 820 while the remaining dependent processors 840 are operating. It is contemplated that the master processor component 840 can be included in a personal computer, which can co-execute the dependent processor functions during the replication periods when the master processor component 830 is not sending control instructions or executing a compiler 850 to compile replication results. Alternatively, the master processor component 840 can be a single CPU within a multi-processor grid unit, as indicated above.

Figure 9:
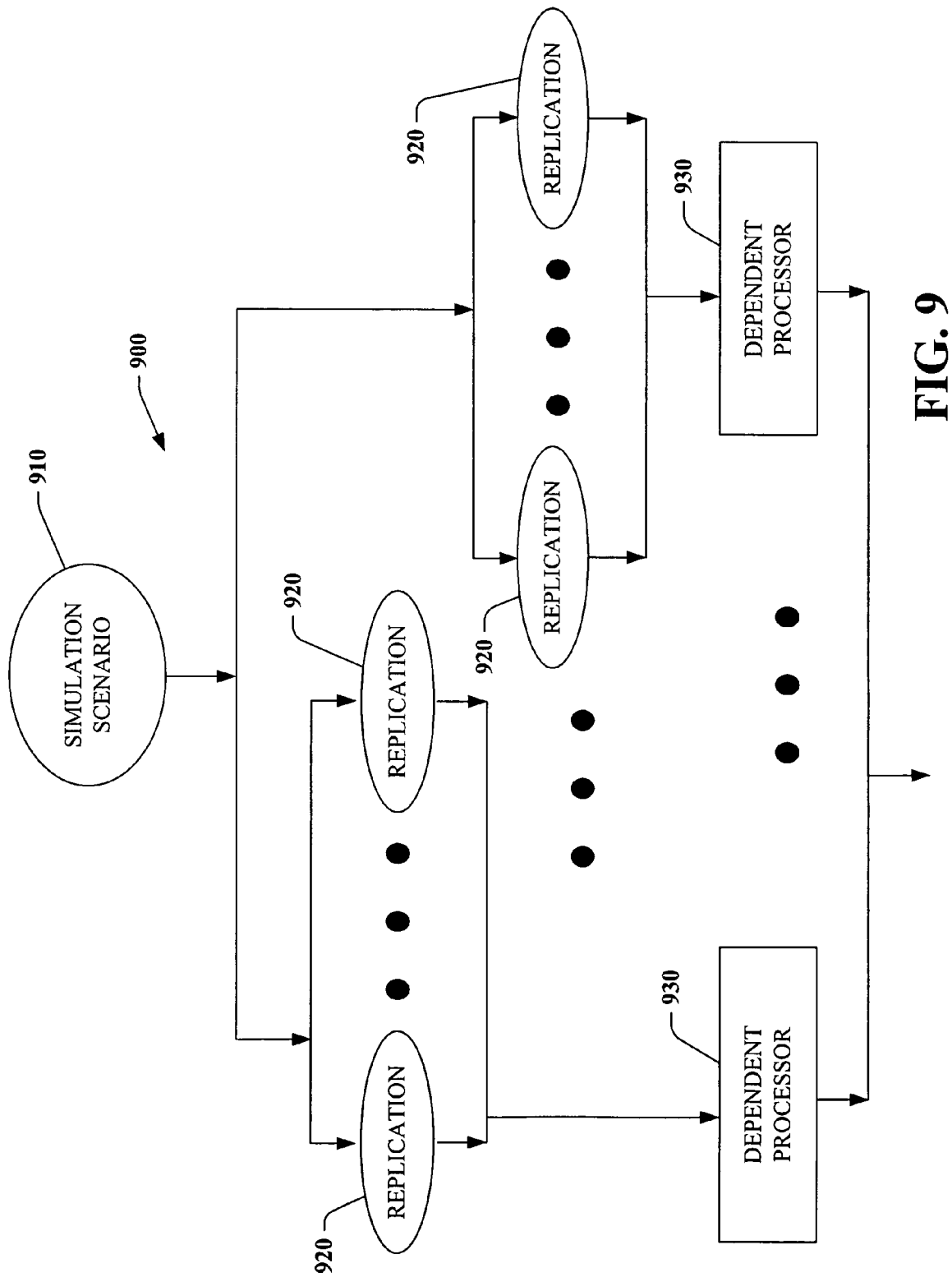
FIG. 9 is a simulation system in which a batch of replications are executed on each of a plurality of processors.

The dependent processor components 840 can execute a single replication or they can execute a set of replications. For example, if a scenario requires twenty replications, these replications can be executed across twenty separate processors so that all the replications can be completed at the same time. However, as shown in the system 900 of FIG. 9, if such system resources are not available, the replications can be distributed over the available processors, e.g. twenty replications 920 of a simulation 910 can be run across five processors 930, so that four replications 920 are performed on each processor 930, thereby reducing simulation time by 80%.

Figure 10:
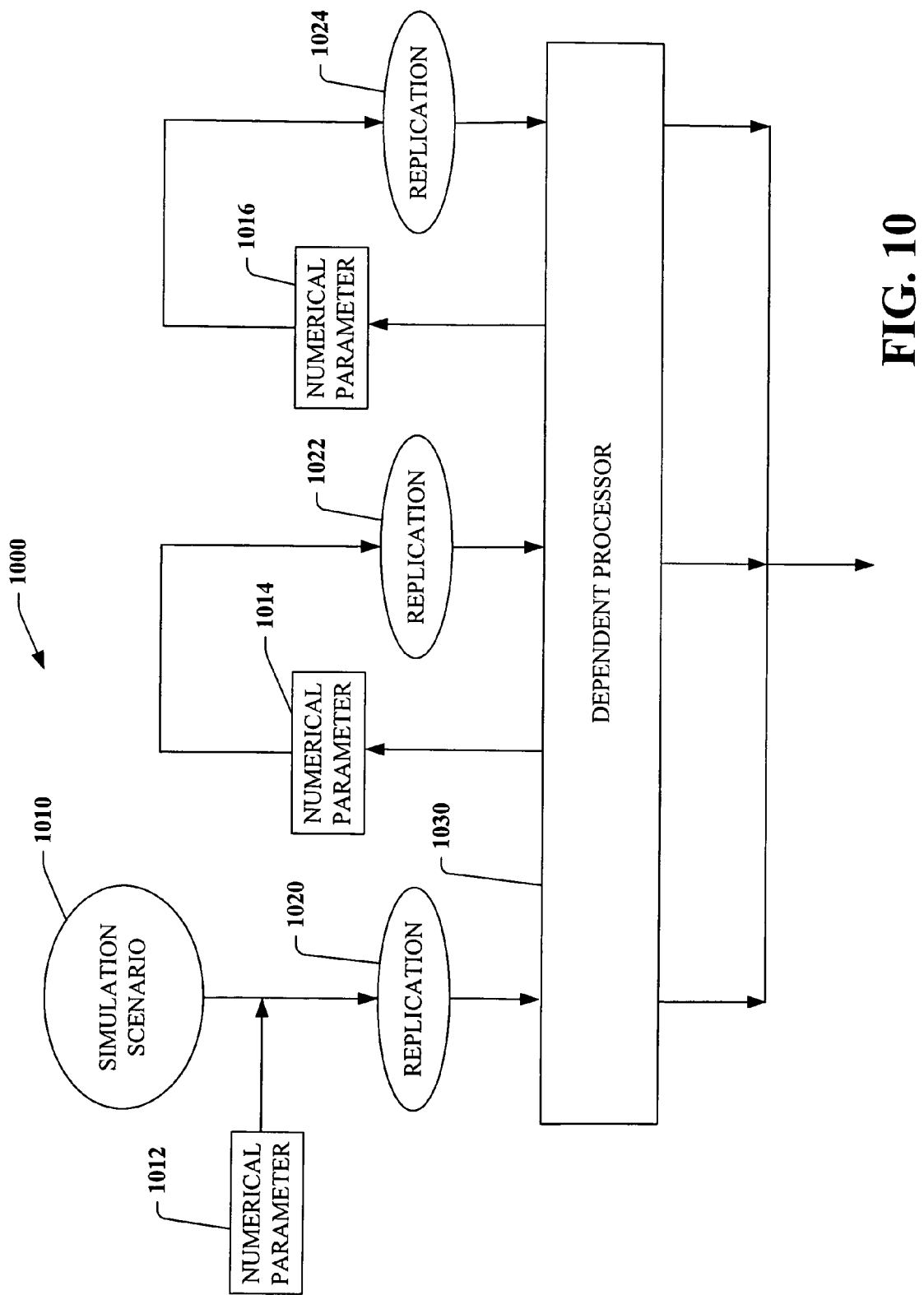
FIG. 10 is a simulation system in which, in a batch of replications, the results of a first replication are used as the initial conditions of a subsequent batch.

In another aspect, as will be shown in connection with FIG. 10, dependent processors can be configured to perform a "batch" of replications in which the initial state of a particular replication is dependent on the outcome of the state of a previous replication. Batch replications have particular applicability to simulations that model the behavior of a "non-terminating" system that runs continuously without a beginning or end. An example of a non-terminating system might be a 24-hour retail establishment that never closes and serves customers continuously. This is contrasted with a "terminating" system, e.g. a bank, which has an opening time with employees standing "idle and empty" waiting to open for customers. In a non-terminating system, it is important to establish initialization and reset conditions for replications. In most models, it is very difficult to obtain a true initial condition so as to sufficiently account for the randomness state inherent in real world systems. It is not sufficient to simply artificially specify starting conditions. More realistic results are obtained by running the scenario in a "warm-up period" for a specified duration, e.g. to simulate one or more days. After the warm-up period, the simulation results are discarded but used to set the initial conditions of the interacting components in the scenario.

During the warm-up period, each of the plurality of processors is configured to execute the scenario with the operation of the randomness factor. After which, the scenario executes based on that initial condition. In the retail example, the numerical parameter might be the number of customers at a check-out register. The operation of the randomness factor upon the interacting components during the warm-up period insures a unique numerical parameter representing customers at the start of each replication. Discarding the warm-up period enables the analyst to "clear the statistics" at the end of a replication but "leave the system intact." In the retail example, the compiled statistics might represent "average customer waiting time" but the intact system might represent "how many people are waiting in line right this instant."

FIG. 10 depicts a simulation model 1000 of a non-terminating system as performed on a single one of multiple processors. In a simulation scenario 1010, an initial numerical parameter 1012 is introduced, after which a warm-up period is executed. A first replication 1020 uses the numerical parameter (e.g. number of customers) resulting from the warm-up period and is executed on the dependent processor 1030. The result of a previous replication in a batch is used to establish an initial condition for a numerical parameter in a subsequent replication. For example, the second replication 1022 in the batch uses the resulting numerical parameter 1014 from the first replication, and is again executed. The third replication 1024 in the batch uses the resulting numerical parameter 1016 from the second replication, and so forth. It should be appreciated that three replications are shown simply for illustration purposes, and that the process can be repeated for any desired number of replications being executed on a single dependent processor 1030. In this way, authentic, representative numerical parameters can be modeled for a non-terminating system. Though the warm-up period is wasted time with respect to the replication series, overall simulation time is nevertheless greatly reduced with the subject distributed replication system.

As disclosed above, the variability in a replication can be determined by the randomness factor. In a specific replication, the randomness factor can be determined by a "random number stream" e.g. simply a string of random numbers produced by a random number generator. In another aspect, the randomness factor is determined by a "random number seed" which enables the simulations to be "pseudo-random" to result in "predictable" randomness. A random number is selected from a constrained set of random numbers so as to introduce an element of determinacy into the randomization process. If a replication is run more than once with a random number seed, the same results would be obtained each time, enabling a measure of control. Preferably, a different random number seed is applied to each batch of replications executed on each processor. A random number seed limits the system to a single set of random numbers so that the randomness factor will only use those random numbers. A different seed results in a different set of random numbers, so that the randomness in the system can be controlled as desired. So if a warm-up in a first replication scenario is running with a first random number seed, a second seed used in a second replication would produce different results.

More precise simulation results can be obtained by running a plurality of "alternative scenarios" of the simulated system. An alternative scenario includes the same interactive components of the basic simulation model, but with different values for the numerical parameters. For example, in the forklift example, one alternative scenario might include ten forklifts while another scenario might include nine or eleven, or every possible number from five to twenty. As noted above, in connection with FIG. 4, the numerical parameter can be inputted prior to executing the scenario, so as to define the specifics of a desired alternative scenario.

Figure 11:
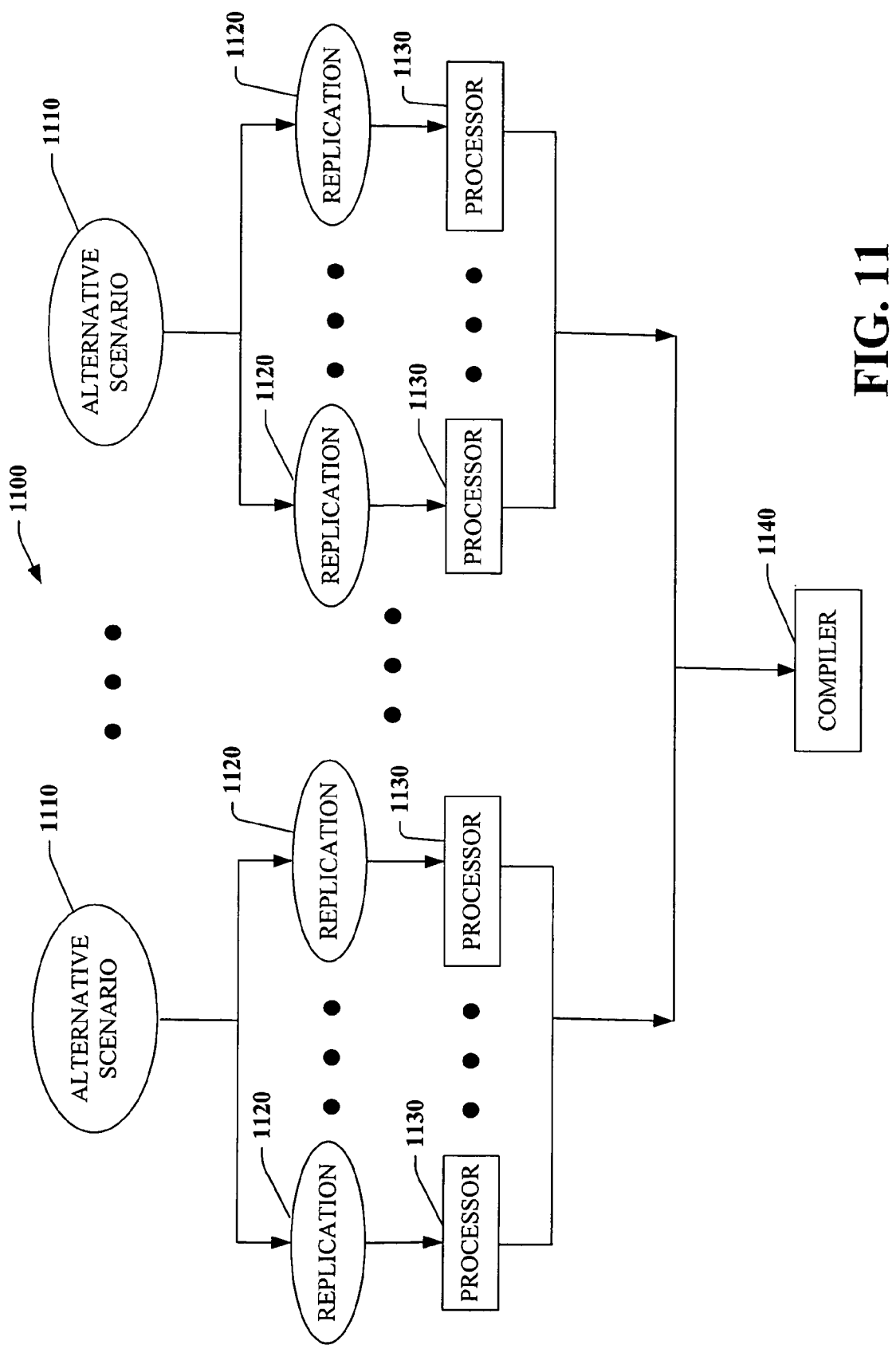
FIG. 11 is a simulation system in which a plurality of alternative scenarios are executed, each with their own sets of replications executed on a plurality of processors.

As shown in FIG. 11, a simulation system 1100 can be configured to run a plurality of alternative scenarios 1110 having similar components but with different numerical parameters. A plurality of replications 1120 are executed on an associated plurality of processors 1130, as discussed in detail above. The results from all the replications 1120 of each alternative scenario 1110 are compiled for analysis. By performing a set of alternative scenarios, the customer can derive more specific information on tailoring their enterprise to eliminate inefficiency, improve performance, reduce costs and otherwise improve the economic benefits of their system.

In another particular aspect, the subject system 1100 can greatly facilitate simulation optimization. In a full optimization, every single possible alternative scenario and combination of parameters is executed to find a best possible system. This can especially be done for simple systems. Optimization creates even more demand for simulation processing, since many scenarios are executed with their own sets of replications. The subject system 1100 facilitates optimization by distributing the replications across multiple processors.

Figure 12:
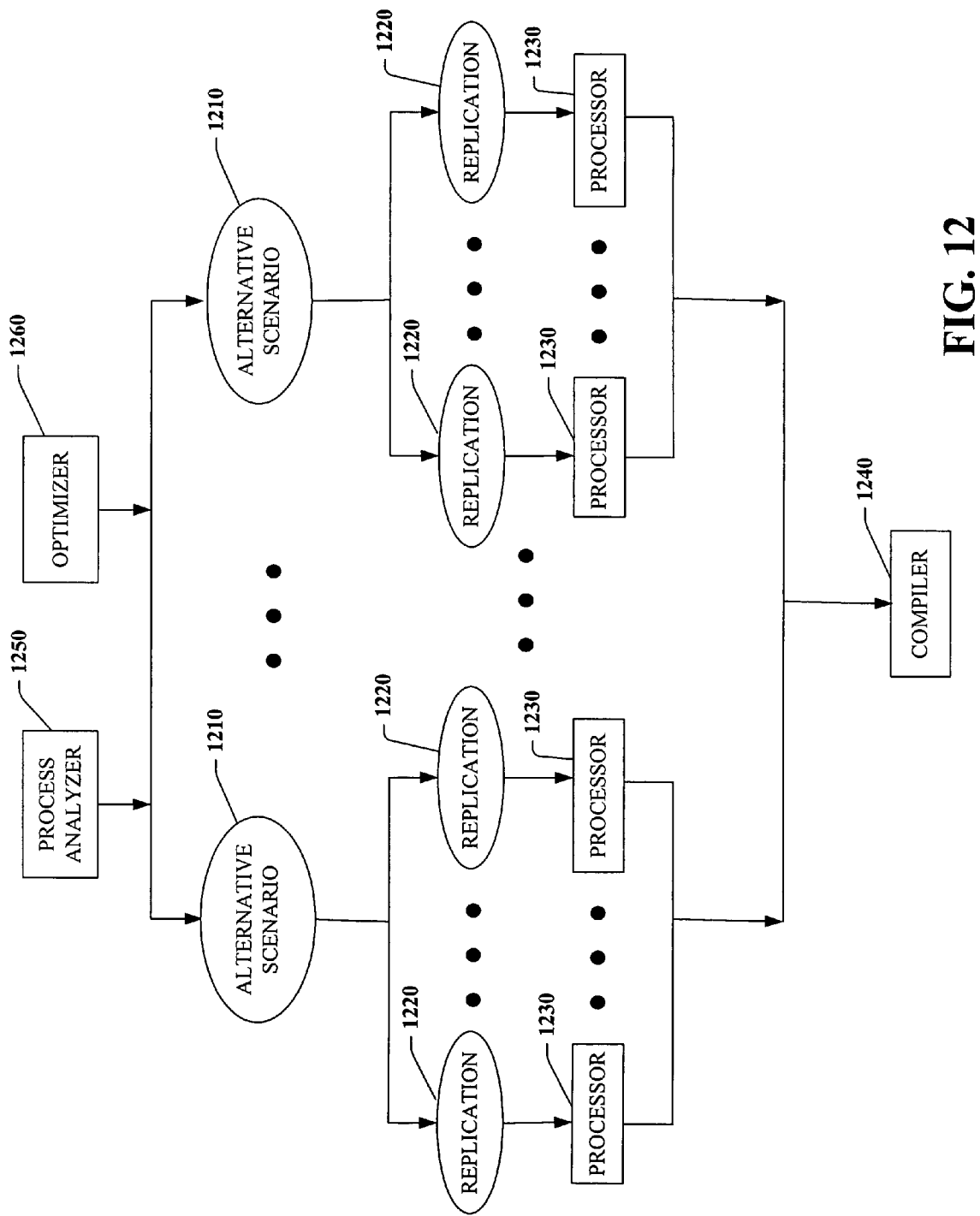
FIG. 12 is a simulation system in which a plurality of alternative scenarios with respective replications are executed including an optimization scheme.

Turning now to FIG. 12, a simulation system 1200 is illustrated. The simulation system 1200 includes an optimizer 1260 that can be used to implement various alternative scenarios 1210 each having their own number of replications 1220 with the result of automatically finding the best answer in accordance with the goals of the simulation. As with the above-noted aspects, a plurality of processors 1230 are used to execute one or more replications 1220. The optimizer 1260 can configure the plurality of processors to execute a sufficient number of alternative scenarios so as to optimize the simulation to obtain the best possible plan for the simulated system. As is also shown in FIG. 12, a process analyzer 1250 can alternatively be used to perform manual optimization. The process analyzer 1250 allows a desired number of alternative scenarios with a set of replications to be specified in which a different numerical parameter is used for each scenario. The numerical parameters can be limited to a small set of values known to be within the desired range. In this way, the number of scenarios 1210 and replications 1220 can be scaled back to within a narrow range of related parameters, thereby reducing the processor load as compared with a full optimization.

Figure 13:
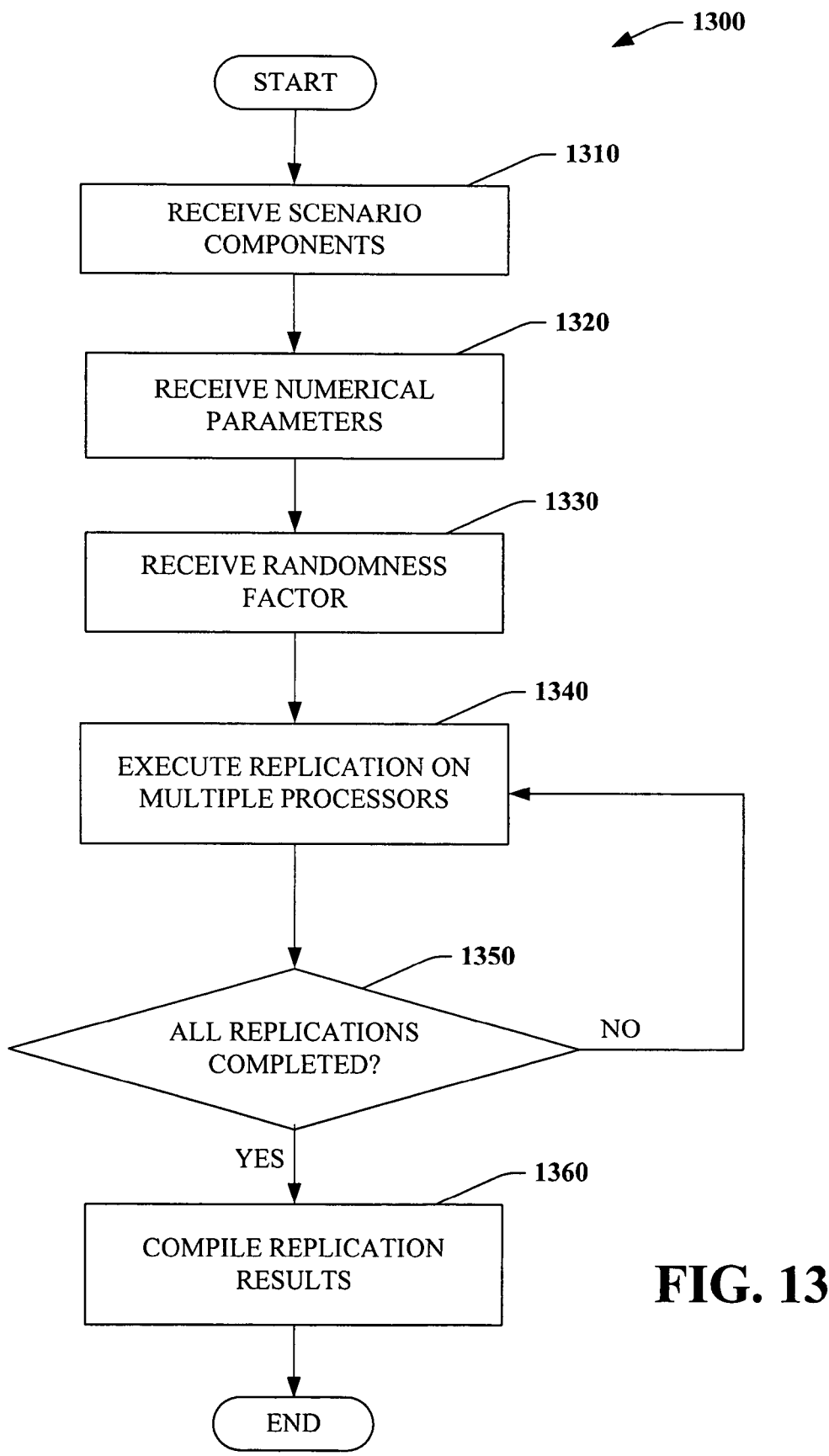
FIG. 13 is a representative flow diagram of a methodology for executing a simulation scenario.
Figure 14:
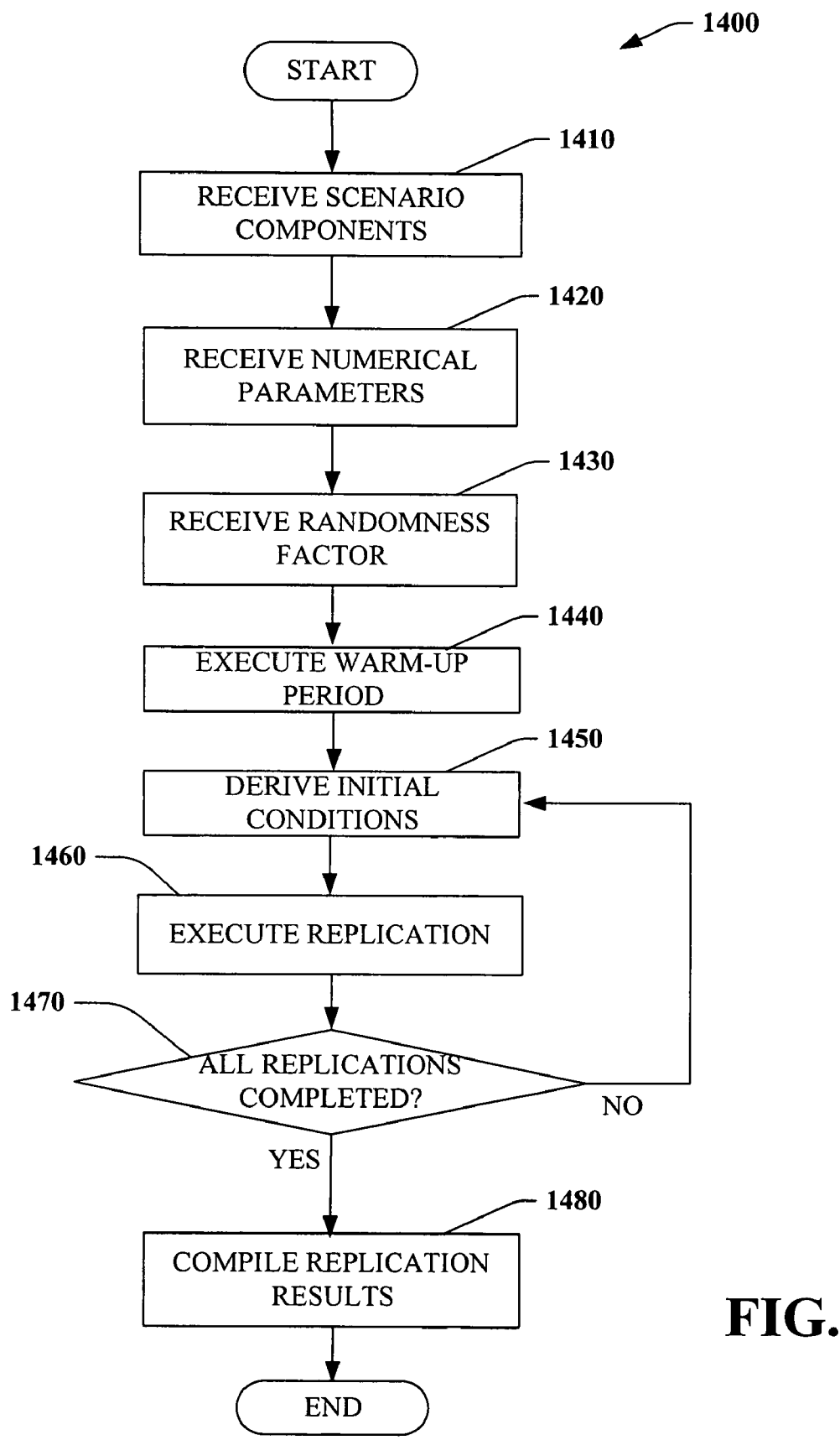
FIG. 14 is a representative flow diagram of a method for simulating a non-terminating system in which a warm-up period is executed prior to commencement of the scenario.

Referring to FIGS. 13-14, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 13, a methodology 1300 for distributing replications associated with a simulation is illustrated. At 1310, a number of interacting components of a simulation scenario are received in a simulation model representing a real world system. At 1320, a number of numerical parameters are received, wherein the numerical parameters represent physical or operational characteristics of the actual component of the real world system. A randomness factor is received at 1330 to modify the operation of the numerical parameters associated with one or more components during the simulation scenario. At 1340 the simulation scenario is executed in a number of replications performed on a number of processors. The randomness factor produces a different outcome for each replication, producing a different simulation result. At 1350 a decision is made as to whether the required number of replications is executed. If it is determined that the required number has been reached, the results of the replications are compiled at 1360 for further analysis. If it is determined that the required number of replications is not yet reached, another replication is executed at 1340, continuing until the required number of replications is reached. In another aspect, the number of replications of the subject simulation method 1300 can be executed on a respective number of processors, e.g. twenty replications on twenty processors. Alternatively, a plurality of replications can be performed on each processor. The replications can be executed over a plurality of networked computers or on one or more multiple processor computer grids.

Now referring to FIG. 14, another simulation method 1400 is illustrated. The method 1400 relates to performing a "batch" of replications on each processor. At 1410, interacting components of a simulation scenario can be defined in a simulation model. At 1420, numerical parameters are defined, wherein the numerical parameters represent physical or operational characteristics of actual components of the real world system. At 1430 randomness factors for one or more components are defined, wherein such randomness factors are configured to modify operation of the numerical parameters during a simulation scenario. At 1440, the scenario is executed with the randomness factor in the numerical parameter for the duration of a warm-up period, and at 1450 initial conditions are derived for the numerical parameters. Subsequent to the warm-up period, at 1460 the simulation scenario is executed in a first replication performed by the associated processor. A number of subsequent replications are executed. Following the replication, at 1470 a decision is made to determine whether the batch of replications is completed. If the batch of replications has not been completed, the result of the previous replication in the batch can be used to establish an initial condition for the numerical parameter in a subsequent replication. If the batch of replications has been completed, the replication results are compiled at 1480 to be used in an analysis of the simulation.

In the subject simulation method 1400, the randomness factor can be determined prior to performing a batch of replications by a random number stream, e.g. by random number generation. Additionally or alternatively, the randomness factor can be determined by a random number seed in which a random number is selected from a constrained set of random numbers. A different random number seed is preferably applied to some or all of the batches of replications performed on each of the processors.

Figure 15:
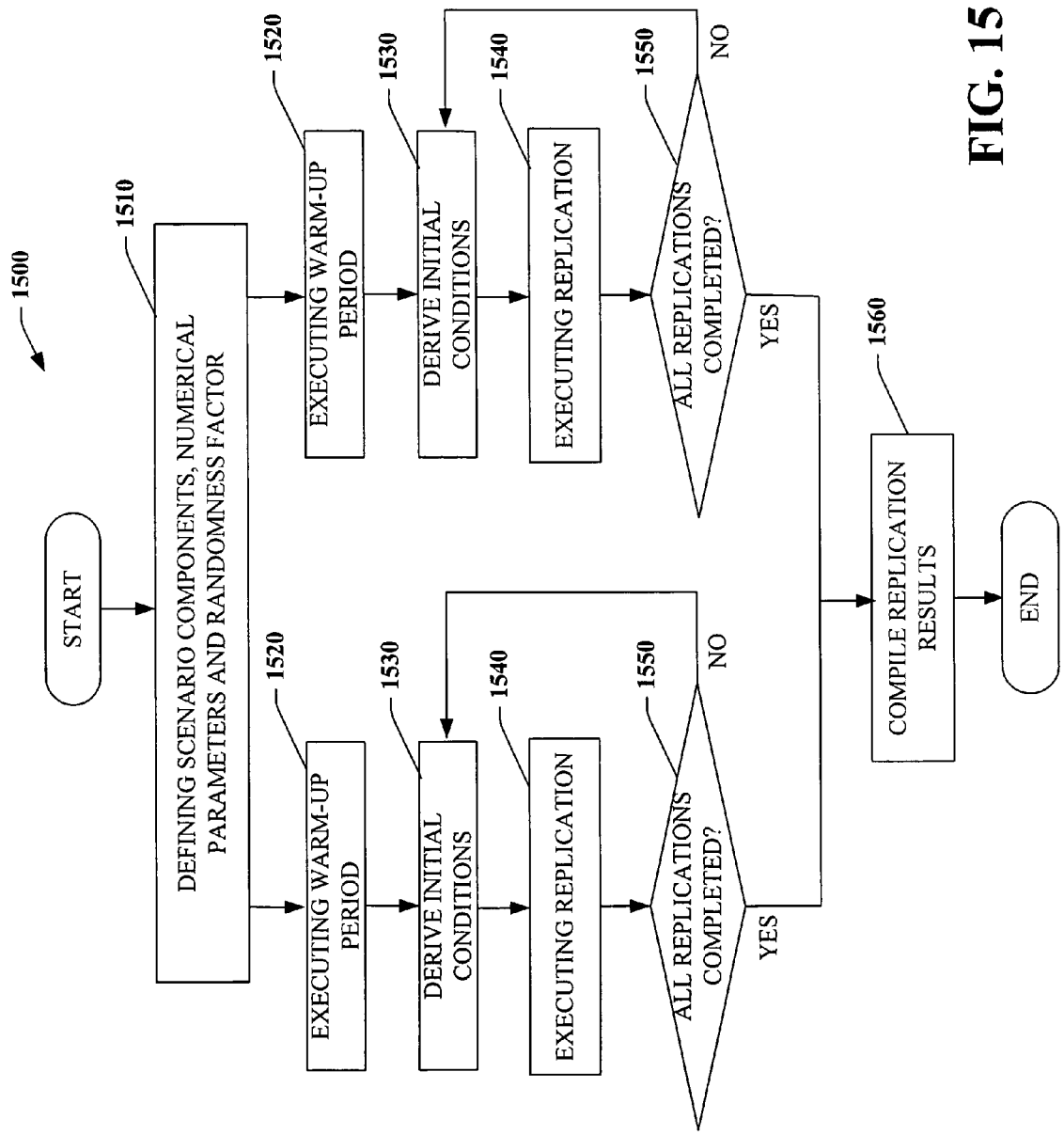
FIG. 15 is a representative flow diagram illustrating a method for simulating a non-terminating system in which a warm-up period is executed prior to commencement of a plurality of scenarios executed on a plurality of processors.

In still another aspect, as shown in FIG. 15, a simulation method 1500 including a number of alternative scenarios is executed. Each alternative scenario includes different numerical parameter corresponding to a modified or substitute component of the system. A sufficient number of alternative scenarios are executed to approach an optimized solution of the simulation. In each alternative scenario, the interacting components, numerical parameters and randomness factors are defined 1510 to represent physical and operational characteristics of the real world system. Each alternative scenario is executed at 1520 for the duration of a warm-up period so as to derive initial conditions at 1530 for the numerical parameters. Following the warm-up period, at 1540 a replication is executed on an associated processor, in a parallel operation to the other processors. A number of subsequent replications are executed. Following the replication, at 1550 a decision is made to determine whether the batch of replications for each alternative scenario is completed. If the batch of replications for each alternative scenario is not completed, the result of the previous replication in the batch can be used to establish an initial condition for the numerical parameter in a subsequent replication. If the batch of replications for each alternative scenario has been completed, the replication results are compiled at 1360 to be used in an analysis of the simulation.

Figure 16:
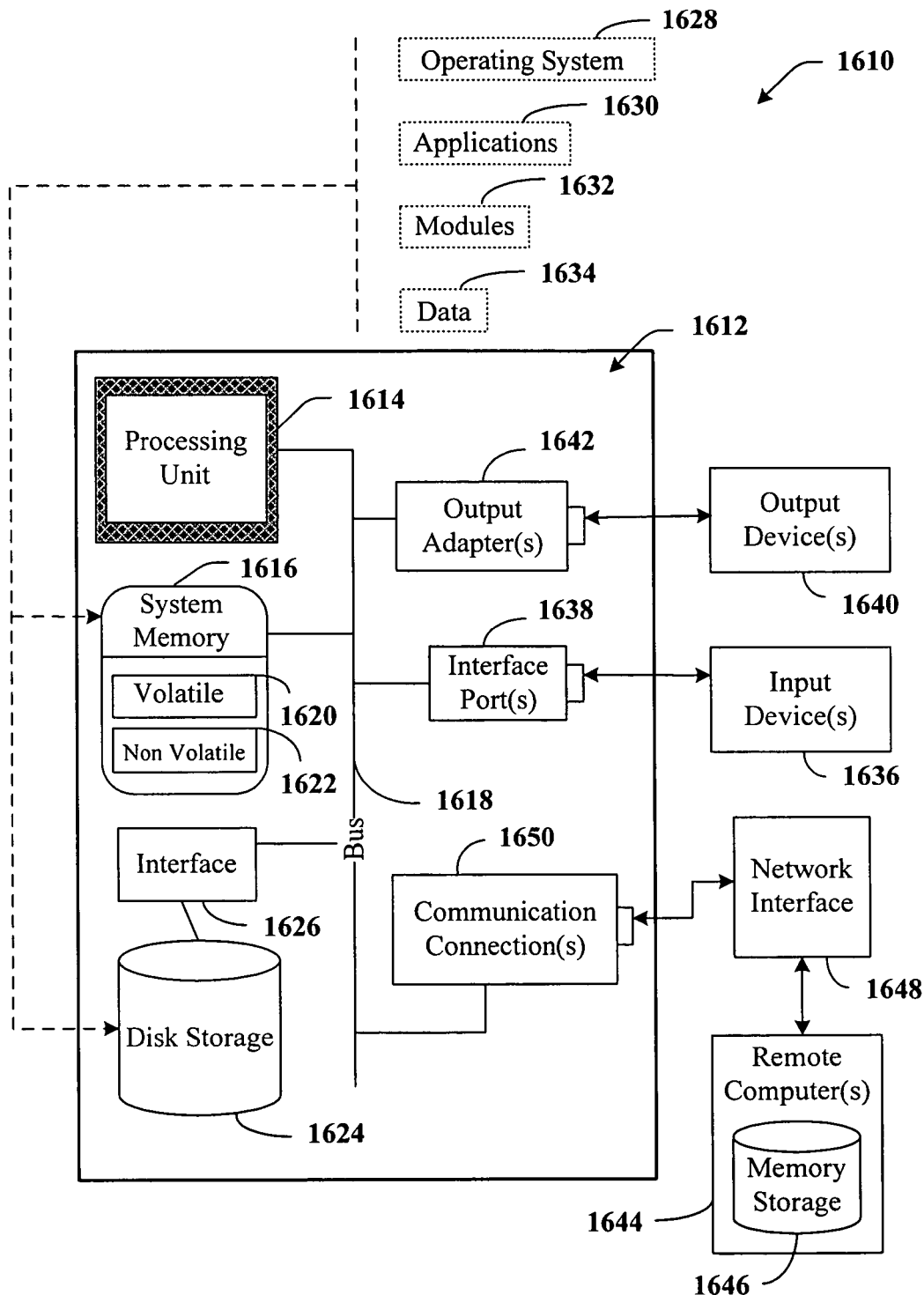
FIG. 16 shows an exemplary environment for implementing various aspects of the claimed subject matter.

With reference to FIG. 16, an exemplary environment 1610 for implementing various aspects of the claimed subject matter includes a computer 1612. The computer 1112 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example, a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

Figure 17:
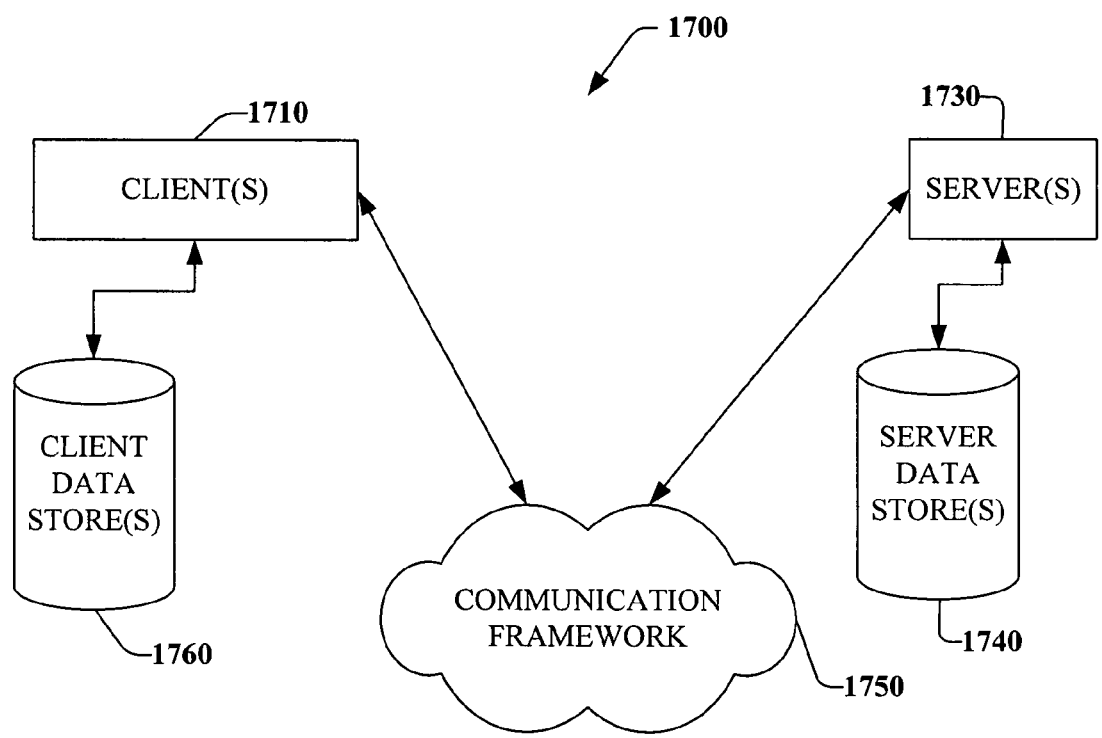
FIG. 17 is a schematic block diagram of a sample-computing environment with which the subject invention can interact.

FIG. 17 is a schematic block diagram of a sample-computing environment 1700 with which the subject invention can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing the subject invention, for example. One possible communication between a client 1710 and a server 1730 can be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A simulation system comprising:
   a receiver component that receives multiple replications of a simulation scenario, the simulation scenario includes a plurality of interacting components each having at least one numerical parameter, wherein each replication operates with a randomness factor that modifies a respective numerical parameter;
   an assignment component that assigns a subset of the replications to multiple processors such that a processor within the multiple processors executes at least one replication;
   a master processor component for initiating multiple replications, comprised of a plurality of dependent processor components, wherein each processor component is configured to execute and return results of at least one replication, and each processor component is further configured such that the result of a previous replication is used to establish an initial condition for the numerical parameter in a subsequent replication; and
   a compiler component for receiving and compiling the replication results from each of the processors.

2. The simulation system of claim 1, further comprising an analyzer component that analyzes processor speed, bandwidth and performance, the assignment component assigns the subset of the replications based at least in part upon the analysis.

3. The simulation system of claim 1, further comprising a compiler component that receives and compiles replications that have been executed by at least two of the multiple processors.

4. The simulation system of claim 1, the master processor component and the plurality of dependent processor components comprise a plurality of computer workstations connected over a network.

5. The simulation system of claim 1, the master processor component and the plurality of dependent processor components comprise at least one multiple processor computer grid.

6. The simulation system of claim 1, the master processor component comprises a dependent processor component.

7. The simulation system of claim 1, each of the plurality of dependent processor components executes a plurality of replications.

8. The simulation system of claim 1, each of the plurality of dependent processor components is configured to perform a batch of replications.

9. The simulation system of claim 8, each of the plurality of dependent processor components is configured to execute the scenario with the randomness factor in the numerical parameter for the duration of a warm-up period so as to establish an initial condition for the numerical parameter prior to performing the batch of replications.

10. The simulation system of claim 8, the randomness factor is determined by a random number stream.

11. The simulation system of claim 8, the randomness factor is determined by a random number seed in which a random number is selected from a constrained set of random Numbers.

12. The simulation system of claim 11, a different random number seed is applied to at least two of the batches of replications performed on each of the plurality of processors.

13. The simulation system of claim 1, the assignment component further comprises a process analyzer for configuring at least a portion of the processors to execute a plurality of alternative scenarios, each including a different numerical parameter.

14. The simulation system of claim 1, the assignment component further comprises an optimizer for configuring the plurality of processors to execute a sufficient number of alternative scenarios to optimize the simulation scenario.

15. A method of distributing replications of a simulation comprising:
   receiving a simulation scenario comprising a plurality of interacting components each including a numerical parameter;
   receiving a randomness factor to modify the numerical parameter of at least one component during the simulation scenario, wherein the randomness factor is determined by a random number seed and wherein a random number seed is a random number selected from a constrained set of random numbers; and executing the simulation scenario in a plurality of batches of replications on each of a plurality of processors, wherein the randomness factor modifies the numerical parameter for the duration of a warm-up period to establish an initial condition for the numerical parameter, and wherein a different random number seed is applied to at least two of the batches of replications performed on each of the plurality of processors.

16. The method of claim 15, executing of the simulation scenario is performed on a plurality of computers connected over a network.

17. The method of claim 15, executing of the simulation scenario in a plurality of replications is performed on at least one multiple processor computer grid.

18. The method of claim 15, prior to performing the batch of replications on at least one of the plurality of processors, the scenario is executed with the randomness factor in the numerical parameter for the duration of a warm-up period so as to establish an initial condition for the numerical parameter.

19. The method of claim 18, the result of a previous replication in a batch is used to establish an initial condition for the numerical parameter in a subsequent replication.

20. The method of claim 18, prior to performing the batch of replications, the randomness factor is determined by a random number stream.

21. The method of claim 18, prior to performing the batch of replications, the randomness factor is determined by a random number seed in which a random number is selected from a constrained set of random numbers.

22. The method of claim 15, further comprising executing a plurality of alternative scenarios each including a different numerical parameter.

23. The method of claim 22, further comprising executing a sufficient number of alternative scenarios to optimize the simulation scenario.

24. A simulation system comprising:

a simulation scenario comprising a plurality of interacting components each including a numerical parameter, at least one of the interacting components comprises a randomness factor to modify the respective numerical factor during the simulation scenario, wherein the randomness factor is determined by a random number seed, and wherein a random number seed is a random number selected from a constrained set of random numbers;

a plurality of processors, each processor executing a batch of replications of the simulation scenario, such that the randomness factor produces a different result for each replication and wherein a different random number seed is applied to at least two of the batches of replications performed on each of the plurality of processors; and a compiler component for receiving and compiling the results from each of the plurality of processors.

25. The simulation system of claim 24, further comprising:

a master processor component for initiating the plurality of replications, the master processor component comprises the compiler component; and a plurality of dependent processor components, each for executing at least one replication and returning the result to the master processor component.

26. The simulation system of claim 25, the master processor component and the plurality of dependent processor components comprise a plurality of computers connected over a network.

27. The simulation system of claim 25, the master processor component and the plurality of dependent processor components comprise at least one multiple processor computer grid.

28. The simulation system of claim 25, the master processor component comprises a dependent processor component.

29. The simulation system of claim 25, each of the plurality of dependent processor components executes a plurality of replications.

30. The simulation system of claim 24, each of the plurality of dependent processor components is configured to execute the scenario with the randomness factor in the numerical parameter for the duration of a warm-up period so as to establish an initial condition for the numerical parameter, prior to performing the batch of replications.

31. The simulation system of claim 24, each of the plurality of processors is configured so that the result of a previous replication in a batch is used to establish an initial condition for the numerical parameter in a subsequent replication.

32. The simulation system of claim 24, the randomness factor is determined by a random number stream.

33. The simulation system of claim 24, further comprising a process analyzer for configuring at least a portion of the plurality of processors to execute a plurality of alternative scenarios, each including a different numerical parameter.

34. The simulation system of claim 24, further comprising an optimizer for configuring the plurality of processors to execute a sufficient number of alternative scenarios to optimize the simulation.

* * * * *

UNITED STATES PATENT AND TRADEMARK OFFICE
CERTIFICATE OF CORRECTION

| | | |
|---|---|---|
| PATENT NO. | : 7,650,267 B1 | Page 1 of 1 |
| APPLICATION NO. | : 11/394612 | |
| DATED | : January 19, 2010 | |
| INVENTOR(S) | : Sturrock et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this

Twenty-third Day of November, 2010

David J. Kappos
*Director of the United States Patent and Trademark Office*